United States Patent
Liang et al.

(10) Patent No.: US 7,298,970 B2
(45) Date of Patent: Nov. 20, 2007

(54) ZOOM FLASH WITH VARIABLE FOCUS LENS

(75) Inventors: Rongguang Liang, Penfield, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 202 days.

(21) Appl. No.: 10/929,820

(22) Filed: Aug. 30, 2004

(65) Prior Publication Data

US 2006/0045501 A1    Mar. 2, 2006

(51) Int. Cl.
*G03B 15/05* (2006.01)

(52) U.S. Cl. .................. 396/62; 396/175; 396/182

(58) Field of Classification Search .............. 396/62, 396/175, 182; 348/177–179, 187, 188, 222.1; 359/665, 666; 362/16–18
See application file for complete search history.

(56) References Cited

U.S. PATENT DOCUMENTS

| | | | |
|---|---|---|---|
| 4,423,940 A * | 1/1984 | Kashihara et al. ............ 396/62 |
| 5,438,486 A | 8/1995 | McNair ........................ 362/61 |
| 5,602,605 A * | 2/1997 | Lierle .......................... 396/175 |
| 5,666,564 A | 9/1997 | Albrecht ........................ 396/62 |
| 6,278,845 B1 | 8/2001 | Terada ......................... 396/175 |
| 6,369,954 B1 | 4/2002 | Berge et al. ................. 359/666 |
| 6,598,986 B2 | 7/2003 | Yano ............................ 362/18 |
| 6,891,679 B2 * | 5/2005 | Atarashi et al. ............ 359/666 |
| 2002/0009297 A1 | 1/2002 | Tanabe ......................... 396/62 |
| 2004/0037549 A1 | 2/2004 | Yano ........................... 396/175 |

FOREIGN PATENT DOCUMENTS

WO    WO 03/069380 A1    8/2003

* cited by examiner

*Primary Examiner*—W. B. Perkey
(74) *Attorney, Agent, or Firm*—Nelson Adrian Blish (57) ABSTRACT

A camera apparatus (10) has a zoom lens (12) having a zoom focus setting that is adjustable over a range of focus values and control circuitry for generating a variable voltage potential according to the zoom focus setting. A flash illumination apparatus (20) has a light source (26) and a variable focus lens (24, 40), the variable focus lens (24, 40) having a first and a second fluid (42, 44) in a chamber (36, 46), the fluids (42, 44) having different indices of refraction and being non-miscible and in contact over an interface surface (54) with variable shape. An electrode (50) applies a variable voltage potential within the chamber (36, 46) for shaping the interface surface (54) according to the zoom focus setting.

8 Claims, 14 Drawing Sheets

ZOOM FLASH WITH VARIABLE FOCUS LENS

FIELD OF THE INVENTION

This invention generally relates to photographic flash apparatus and more particularly relates to flash apparatus capable of operation at variable scene coverage angles.

BACKGROUND OF THE INVENTION

In photography, there is a recognized need for providing flash illumination at an angle that is suited to the scene coverage angle of a zoom lens. The photographic zoom lens capable of a range of focus from telephoto to wide angle settings and provides the best image quality when the flash illumination angle is adjusted to correspond to the scene coverage angle. At a telephoto setting, for example, the optimum flash illumination is substantially well collimated. At its other extreme, a wide angle setting, the preferred flash illumination also has a relatively wide angle.

A number of methods for providing flash illumination at adjustable angles have been proposed. Conventional approaches vary the spatial relationship of the flash light source relative to the supporting illumination optics. For example, one way to change the scene coverage angle of the flash is to move the flash lamp along the optical axis of the flash reflector. As the lamp is moved away from the back of the reflector, the pattern of light is spread to cover a larger area. A disadvantage to this method is that the flash lamp must be moved mechanically. If the movement mechanism allows the flash lamp to move off-axis with respect to the optical axis of the reflector, then the pattern of illumination also shifts as a function of the location of the flash lamp with respect to the reflector.

Yet another method for changing the scene coverage angle is to position a lens at a variable position in front of the reflector along its optical axis. This approach is used, for example, to provide a variable strobe illumination angle, as disclosed in U.S. Pat. No. 6,598,986 and U.S. Patent Application Publication No. 2004/0037549 (both by Yano). This method can be effective, but requires that there be sufficient clearance in front of the reflector in order for the lens to travel along its optical axis. In addition, a mechanism for supporting and moving the lens is required.

Similar approaches using variable lens positioning include the use of retracting cylindrical lens arrays that can be suitably positioned according to camera focus, as disclosed in U.S. Patent Application Publication No. 2002/0009297 (Tanabe). Yet another technique adapts flash illumination angle by varying the relationship of a pair of wave lenses, as disclosed in commonly-assigned U.S. Pat. No. 5,666,564 (Albrecht). While these and related methods have merit for adapting the flash illumination angle for many applications, they require at least some level of mechanical movement and may not be easily adaptable, particularly for compact cameras. Solutions such as that disclosed in U.S. Pat. No. 6,278,845 (Terada), in which components in the finder optics path also serve to provide variable angle flash illumination, can be specifically tailored to individual camera designs, but are not easily implemented in a broad range of camera types.

A still further method changes the scene coverage angle of a flash by changing the shape of the reflector. Depending on how much angular change is needed, the volume of the reflector may change substantially. This provides an opportunity to vary the distribution of light within the scene coverage angle in addition to changing the scene coverage angle itself. While this can be a useful feature, it may require a complex mechanism that is somewhat sensitive and is not easy to operate.

While conventional solutions can provide some measure of variable flash illumination angle, there is felt to be considerable room for improvement. The need for a zoom flash mechanism that is relatively inexpensive and mechanically robust is particularly compelling with the advent of less expensive compact cameras, both digital and film-based.

SUMMARY OF THE INVENTION

Briefly, according to one aspect of the present invention, a camera apparatus comprises:
  a) a zoom lens having a zoom focus setting that is adjustable over a range of focus values;
  b) control circuitry for generating a variable voltage potential according to the zoom focus setting;
  c) a flash illumination apparatus comprising a light source and a variable focus lens, the variable focus lens comprising:
    i) a first and a second fluid in a chamber, the fluids having different indices of refraction, the fluids being non-miscible and being in contact over an interface surface with variable shape; and
    ii) an electrode for applying the variable voltage potential within the chamber for shaping the interface surface according to the zoom focus setting.

It is a feature of the present invention that it employs a liquid lens for varying the angle of camera flash illumination.

It is an advantage of the present invention that it allows automatic adjustment of the focus setting for flash illumination, according to the zoom setting of a camera or other factors. The present invention allows embodiments in which flash illumination angle can be automatically adjusted without the need for manual manipulation and adjustment of zoom illumination optics.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The present invention adapts the variable focus capabilities of liquid lens or fluid lens technology for providing flash illumination at a range of scene angles. Exemplary embodiments of variable focus liquid lens technology are disclosed in the following: U.S. Pat. No. 6,369,954 (Berge et al.); and International Patent Publication WO 03/069380 (Feenstra et al.)

Liquid lenses of this type use two non-miscible, isodensity liquids, in contact over an interface surface. The two liquids are confined in a chamber having a conductive substrate that is covered by a thin insulating layer. One liquid is an insulator and the other is a conductor, and their respective indices of refraction differ. The liquid lens provides variable focal length utilizing an electrowetting phenomenon, in which the voltage applied to the substrate modifies the contact angle of the liquid drop. This application of voltage effectively changes the curvature of the liquid-to-liquid interface surface, which in turn changes the focal length of the lens.

In conformance with terminology used in the chemical arts, the interface surface between the two liquids is termed a "meniscus" in much of the literature on liquid lenses. However, in the optical arts, the term "meniscus" generally describes a type of lens having a convex surface and a concave surface. The liquid lens structure may or may not act as a meniscus lens in a specific application. To avoid confusion between liquid surface dynamics and lens types, the present application does not employ this term to describe the shape of the surface at which the two liquids meet. Instead, this surface is simply termed the "liquid interface surface" in the present application.

Among advantages cited for fluid lens technology include a relatively large inverse focal length range, robustness, fast response with minimal hysteresis, good optical quality and transparency in the visible range, stability over a wide operating range, and low electrical consumption. Applications that have been proposed for liquid lenses include use as autofocus devices in electronic cameras and sensing equipment. Because lenses of this type can be particularly well suited for compact, portable devices, potential applications for image sensing in medical imaging and telemetry are of particular interest.

The conventional liquid lens is a circular lens of limited size, typically about 5 mm in diameter. With a larger size, the sag of the liquid interface surface between the two liquids becomes difficult to control precisely, resulting in an amount of aberration generated from this surface. Thus, for imaging purposes, there are significant practical constraints to liquid lens diameter. As a result, the design of liquid lens technology has been directed toward obtaining acceptable image quality for cameras and sensing apparatus, not toward the use of this technology for illumination applications. Because only smaller liquid lenses have been used, this technology has been overlooked for use in flash illumination.

One earlier type of variable focus lens countered this size limitation by using a controllable amount of translucent fluid within a deformable membrane. The illumination apparatus disclosed in U.S. Pat. No. 5,438,486 (McNair) had been proposed for use in varying the illumination focus of automobile headlights. However, this application does not employ the electrowetting behavior indicated above for liquid lenses, in which the liquid-to-liquid interface surface shape controls refraction. Instead, the apparatus of U.S. Pat. No. 5,438,486 utilizes a complex pressure control system to regulate the flow and quantity of refractive liquid in a type of bladder within the headlight mechanism. The solution proposed in U.S. Pat. No. 5,438,486 is directed at an application characterized by relatively high heat for continuous illumination with a large-scale light source. However, such a mechanism for changing fluid volume would be unwieldy and poorly suited to the requirements of zoom flash imaging.

Figure 1:
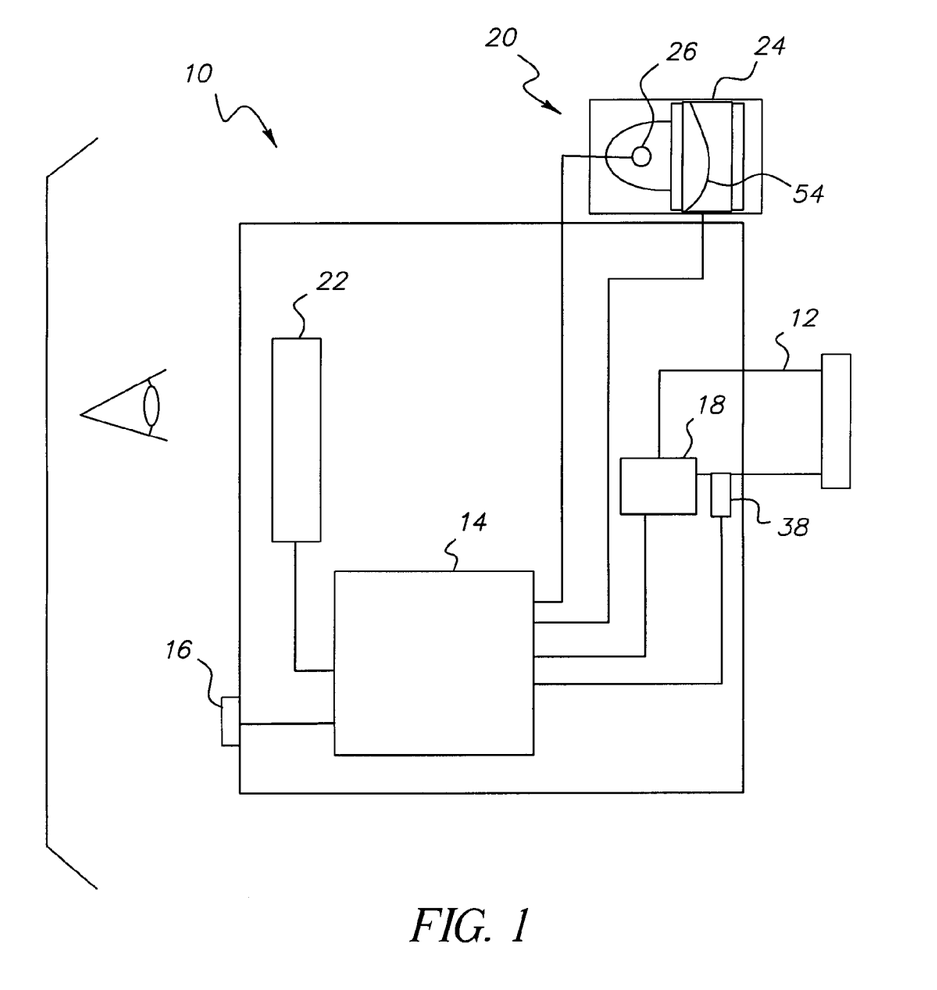
FIG. 1 is a schematic block diagram showing a camera apparatus having a zoom flash apparatus according to the present invention.

Referring to FIG. 1, there is shown an embodiment of a camera apparatus 10 equipped with a zoom lens 12 and using a variable focus flash apparatus 20 having a liquid lens 24. A control logic processor 14, typically including a dedicated microprocessor with its necessary support and interface circuitry, controls and monitors a number of functions within camera apparatus 10. In the embodiment shown, control logic processor 14 drives an actuator 18 that adjusts the position of zoom lens 12. Alternately, where zoom lens 12 is set manually, a positional sensor 38 is deployed to provide a feedback signal based on the zoom lens 12 setting. According to this sensed signal, control logic processor 14 adjusts a control voltage signal provided to variable focus flash apparatus 20 that shapes a liquid interface surface 54 in order to provide flash illumination at an appropriate angle.

The typical image capture process using camera apparatus 10 follows the conventional model. Initially, a zoom setting for zoom lens 12 is made, either manually or automatically controlled by control logic processor 14. The operator initiates recording of an image onto a recording medium 22 by actuating a shutter control 16. Recording medium 22 can be a CMOS or CCD detector that connects to or is monitored by control logic processor 14, as shown in FIG. 1, or can be a segment of film or other photosensitive medium. Control logic processor 14 controls the focus setting of liquid lens 24, such as by a control voltage that alters the electrowetting behavior described above. To capture the image, control logic processor 14 flashes a light source 26. The image can then be recorded onto recording medium 22.

It can be readily appreciated by those skilled in the electronic arts that control logic processor 14 and its related components for optionally controlling zoom actuator 18, calculating or obtaining feedback on zoom lens 12 focus position, generating the needed voltage potential to control the shape of interface surface 54 of flash apparatus 20, and controlling the overall imaging function of camera apparatus 10 can take many forms.

Lens Behavior

Figure 2A:
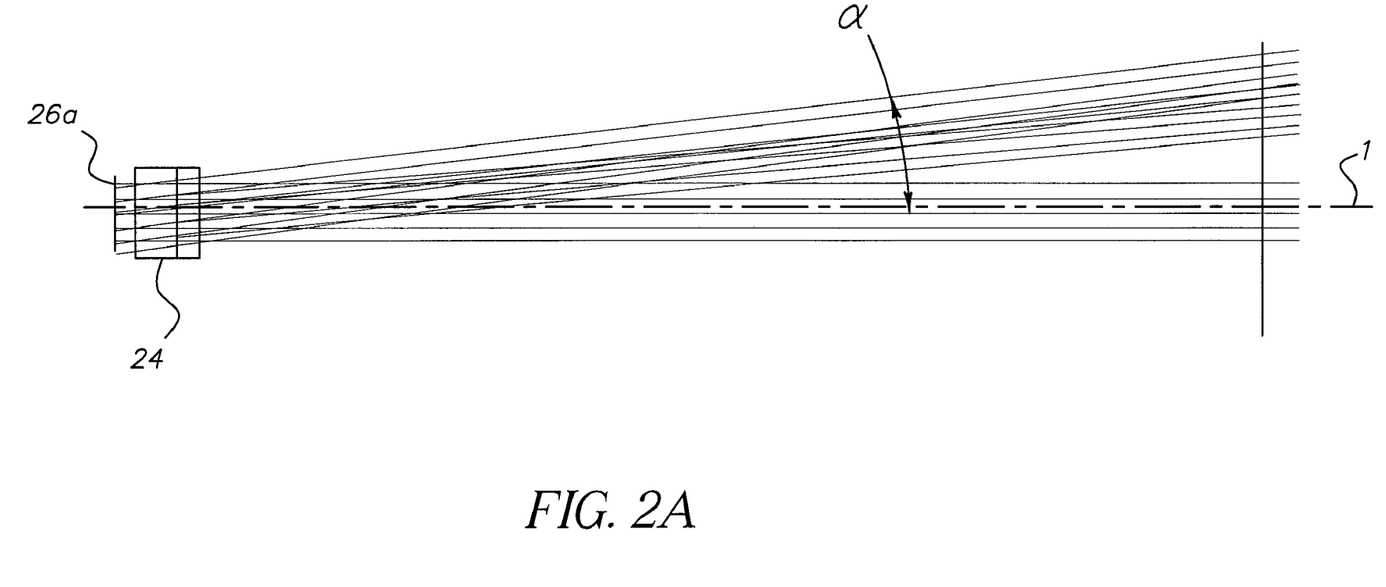
FIGS. 2A and 2B are cross-sectional diagrams showing refraction of relatively uncollimated flash illumination for telephoto and wide angle zoom positions, respectively.
Figure 2B:
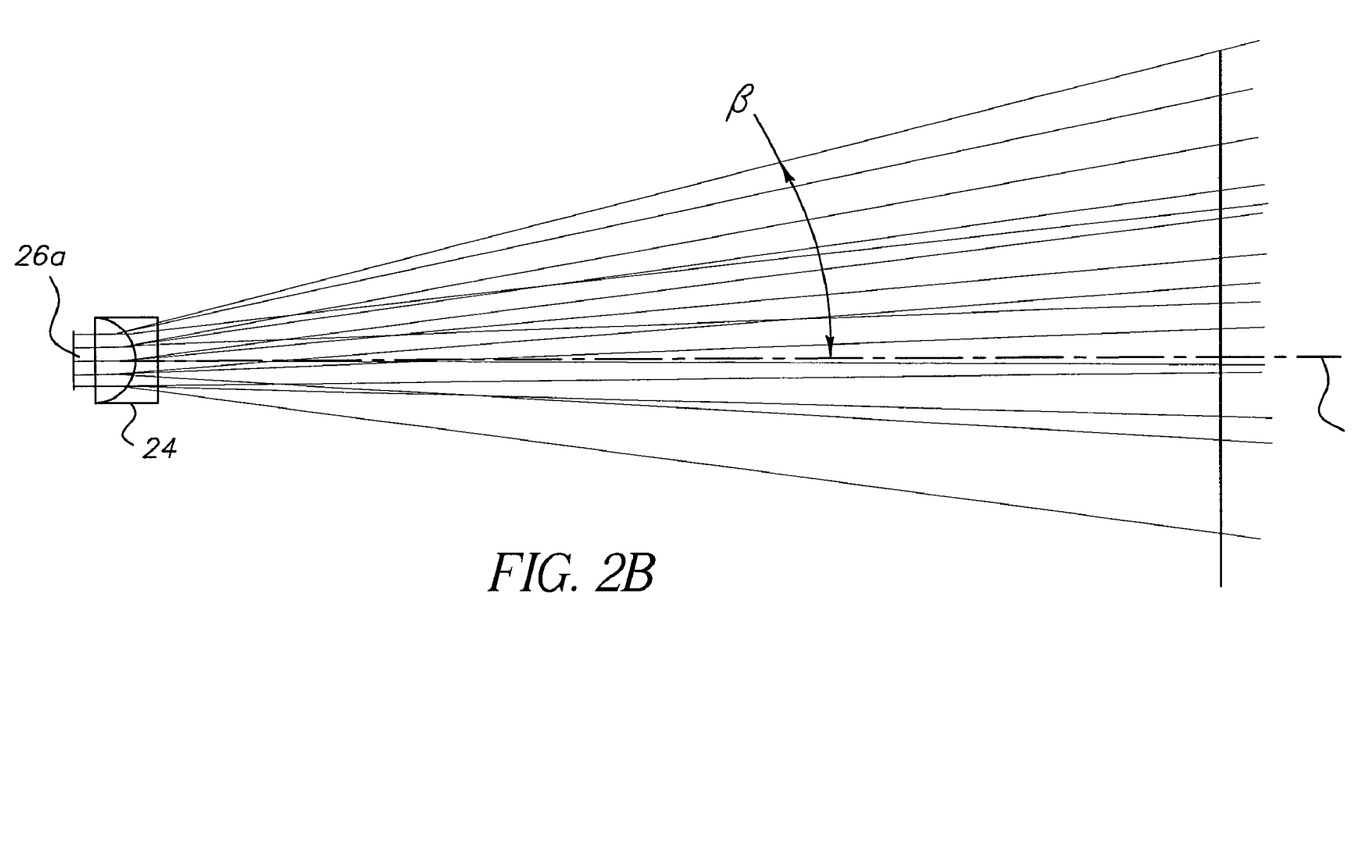

In order to better understand how the apparatus of the present invention operates, it is first useful to understand the refractive function of liquid lens 24 under various conditions. Comparing FIGS. 2A and 2B, light distribution from a source 26a with a divergence angle α is shown, relative to a central illumination axis 1, shown with a dotted line here and in subsequent figures. For FIG. 2A, no voltage is applied to liquid lens 24; thus, there is essentially no change of the divergence angle from light source 26a. By comparison, the result when voltage is applied to liquid lens 24 is shown in FIG. 2B. Here, the incident light from light source 26a is refracted by liquid lens 24, causing significant change of divergence angle β of the illumination from the reference illumination axis I. With respect to zoom positions, FIG. 2A shows the characteristic behavior of liquid lens 24 at a telephoto position. FIG. 2B shows the characteristic behavior of liquid lens 24 at a wide angle position.

Figure 3A:
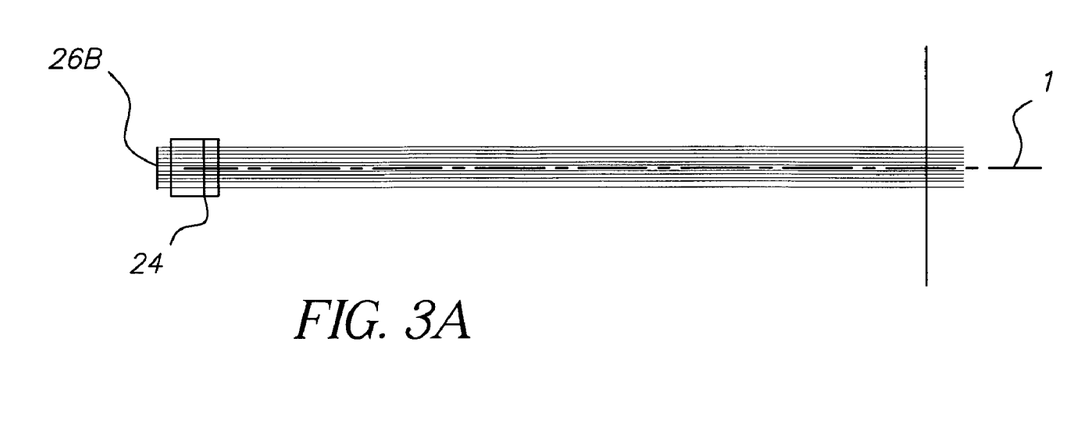
FIGS. 3A and 3B are cross-sectional diagrams showing refraction of collimated flash illumination for telephoto and wide angle zoom positions, respectively.
Figure 3B:
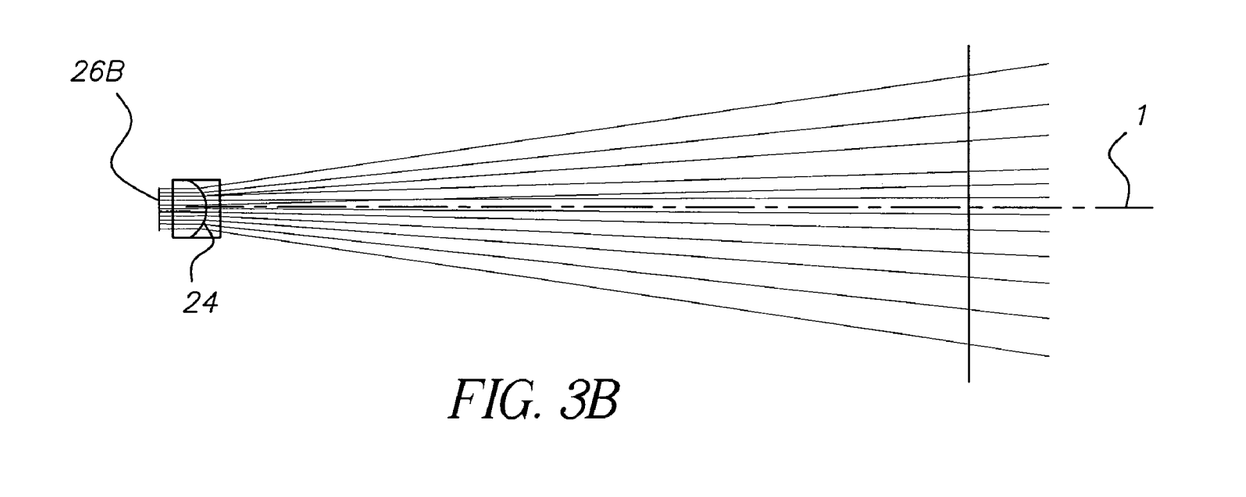

A relatively more uniform operation occurs when the incident illumination is relatively well collimated. FIGS. 3A and 3B show the unactuated (telephoto) and maximum actuated (wide-angle) states, respectively, of liquid lens 24 for a well collimated light source 26b.

Figure 4:
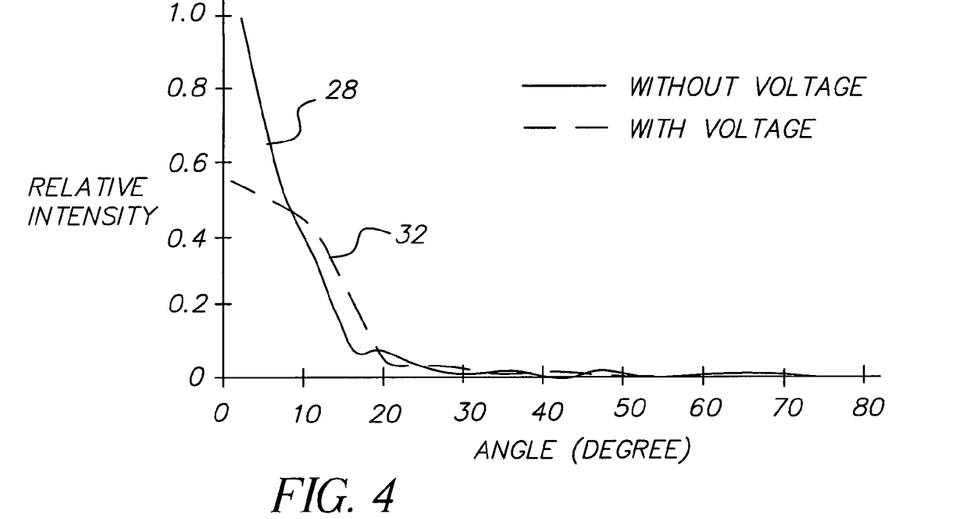
FIG. 4 is a graph showing zoom flash lens intensity with respect to angular spread, with and without applied voltage, for a typical set of refraction indices.
Figure 5:
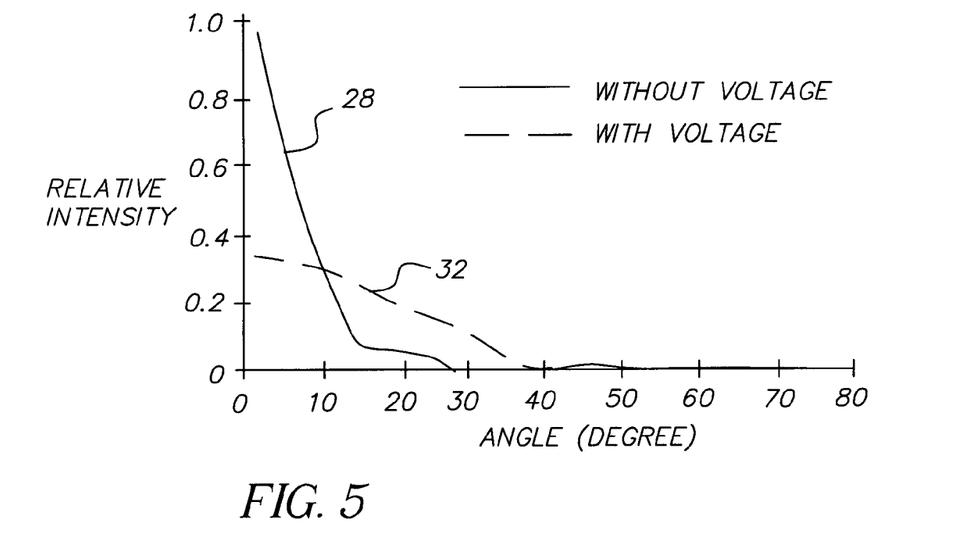
FIG. 5 is a graph showing zoom flash lens intensity with respect to angular spread, with and without applied voltage, for an alternate set of refraction indices.

The graphs of FIGS. 4 and 5 show relative light intensity versus angle for liquid lens 24, with and without applied voltage and with different refractive indices. FIG. 4 gives a no-voltage curve 28 and a voltage applied curve 32 where the refractive indices of liquids used within liquid lens 24 are 1.33 and 1.54. Similarly, FIG. 5 gives a no voltage curve 28 and a voltage applied curve 32 where the refractive indices of liquids used within liquid lens 24 are 1.33 and 1.78. This series of graphs illustrates that an increased difference in refractive index between the component fluids within liquid lens 24 results in increased divergence angles for incident light.

While FIGS. 2A, 2B, 3A, and 3B show characteristic performance only at extreme telephoto and wide angle positions, liquid lens 24 is capable of variable focus over a continuous range of zoom lens settings between these extremes. The voltage level applied to the liquid components of liquid lens 24 adjusts the refraction by reshaping interface surface 54 according to the position of zoom lens 12, as was described with reference to FIG. 1.

Liquid Lens 24 Construction

The conventional liquid lenses described in U.S. Pat. No. 6,369,954 and in the Feenstra et al. WO 03/069380 application are constructed as circular lenses, designed to perform similarly to conventional spherical lenses. Using conventional fabrication, the circular liquid lens 24 is housed within a circular-cylindrical chamber that holds the lens fluids and gives the lens its circular characteristics. With conventional circular lens design, the optical axis is generally coincident with the central axis of the cylinder containing the refractive liquids.

Figure 6A:
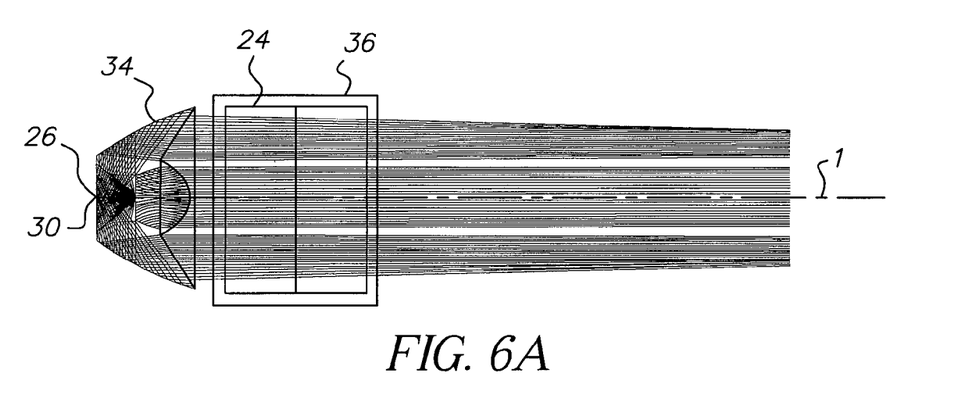
FIGS. 6A, 6B, and 6C show a zoom flash apparatus in an embodiment using a circular liquid lens.
Figure 6B:
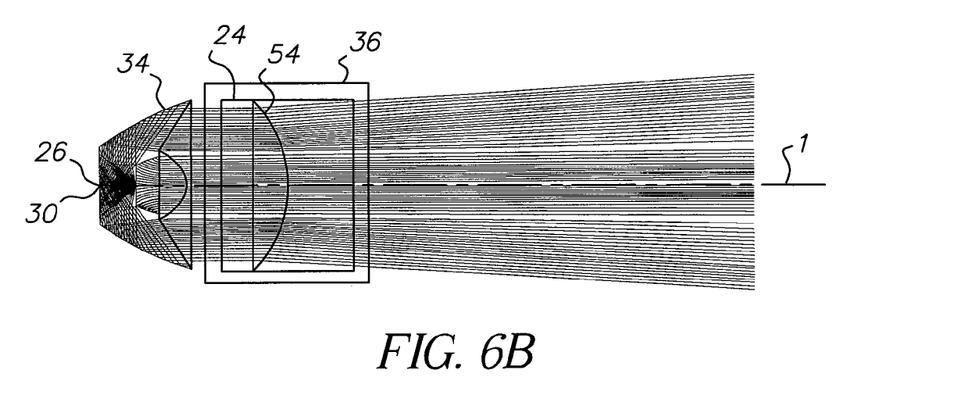
Figure 6C:
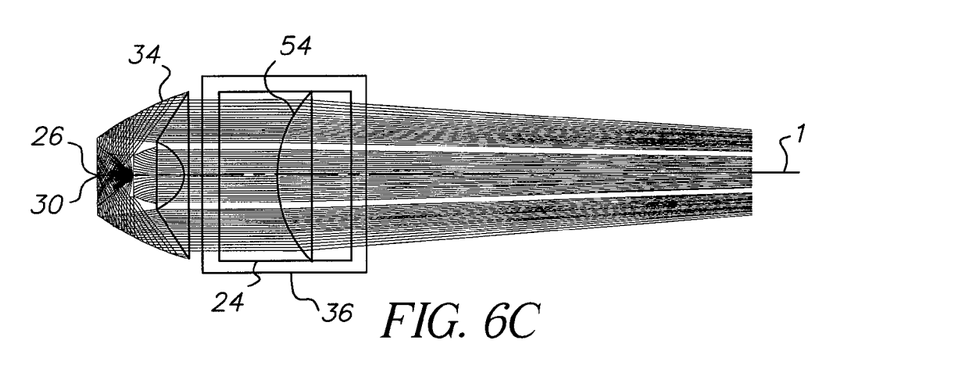
Figure 6D:
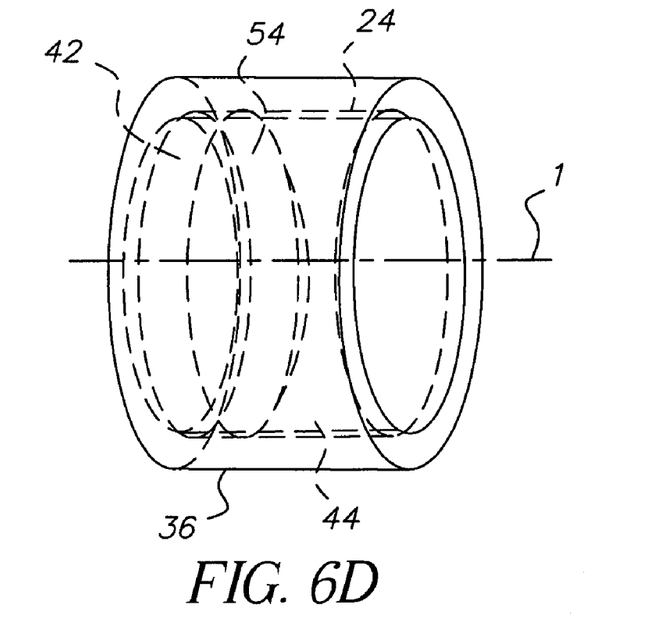
FIG. 6D shows a perspective view of a liquid lens in embodiments of FIGS. 6A, 6B, and 6C.

One embodiment of flash apparatus 20 using a circular liquid lens 24 is shown, for different zoom settings, in FIGS. 6A, 6B, and 6C. Here, an LED 30 is used as light source 26. A collimator structure 34 provides collimation for the emitted light. Liquid lens 24 is constructed with an interface surface 54 within a cylindrical chamber 36, shown in side view in FIGS. 6A-6C, using the conventional circular lens model. FIG. 6A shows light behavior at the telephoto setting of zoom lens 12, where there is no voltage applied to flash apparatus 20. FIG. 6B shows the refraction of light by flash apparatus 20 where zoom lens 12 is in the wide angle position. FIG. 6C shows how it would be possible, at a different applied voltage setting, to focus illumination to a small area. FIG. 6D shows a perspective view of liquid lens 24 with interface surface 54 having a circular arrangement. Illumination axis I is generally coincident with the axis of the circular cylinder of liquid lens 24 in this arrangement.

The circular lens arrangement of FIGS. 6A-6D, employing a right circular cylinder for forming a circular lens, is generally the preferred configuration where light source 26 is itself at least somewhat circular with respect to the image plane. LEDs and various types of circular lamps would be best suited as light source 26 for this type of circular lens arrangement. However, other lens architectures are possible for liquid lens 24, particularly lens geometries that are more ideally suited to tube flash illumination.

Figure 7A:
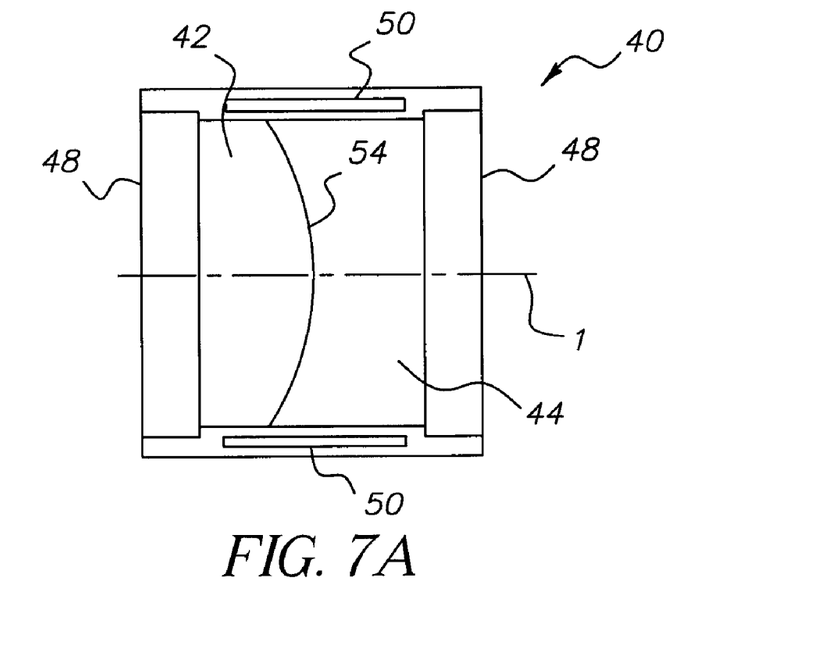
FIGS. 7A, 7B, and 7C show side and perspective views of a liquid lens used in an embodiment of the present invention using a cylindrical liquid lens.
Figure 7B:
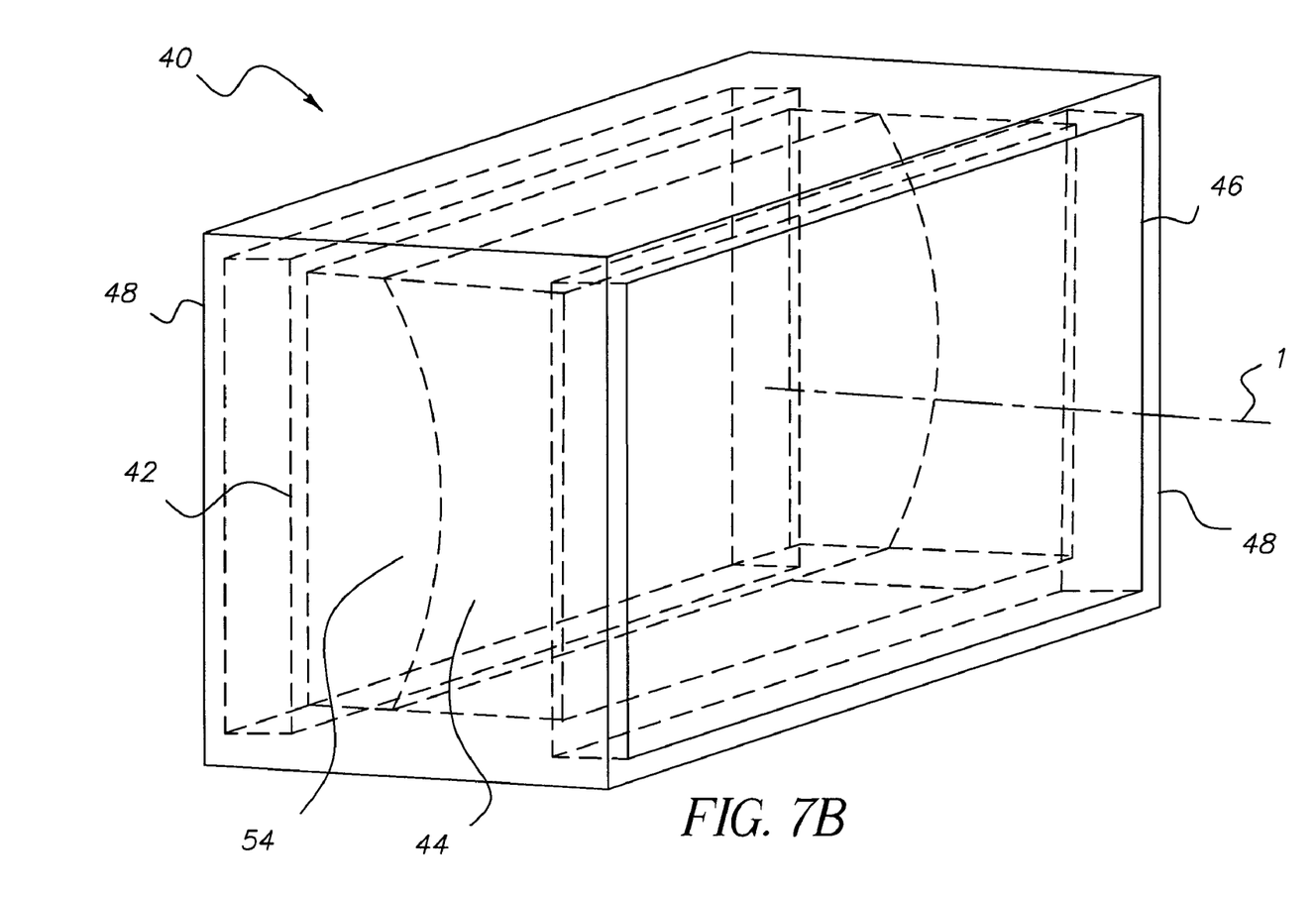
Figure 7C:
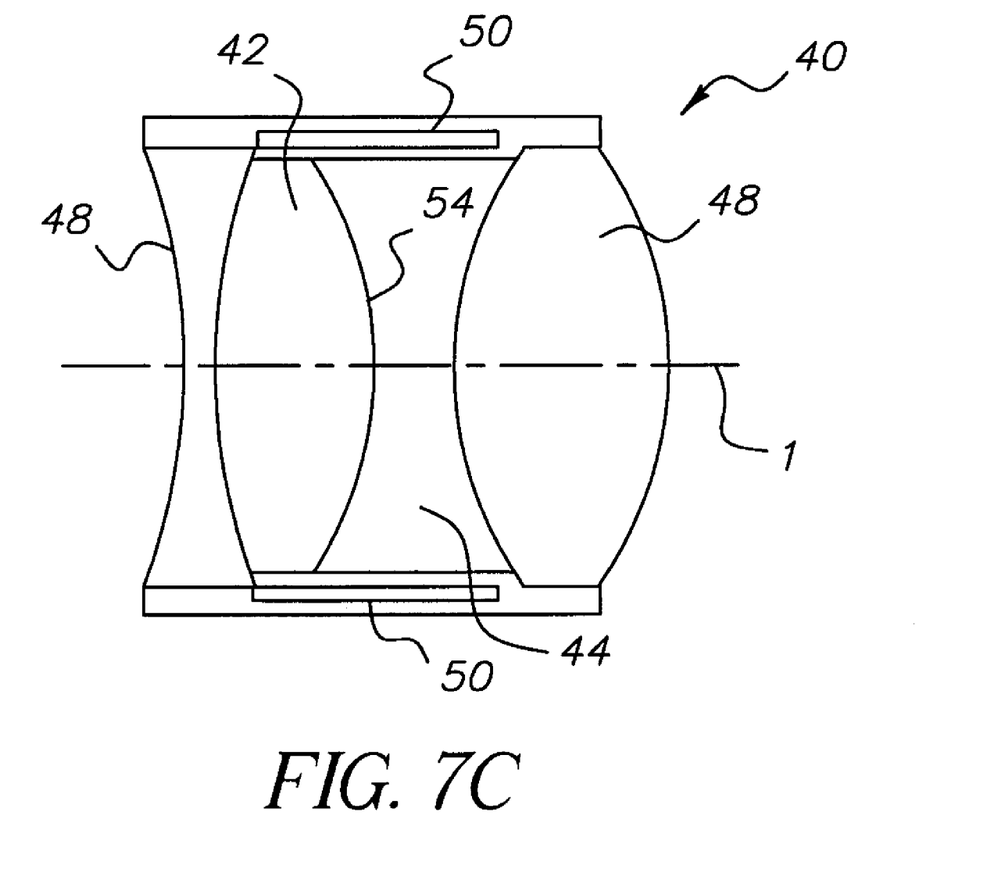

In contrast to the circular lens arrangement of FIGS. 6A-6D, FIGS. 7A and 7B, show an alternative design for a cylindrical liquid lens 40. FIG. 7A shows the mechanism for forming this alternative lens shape in side cross-section. FIG. 7B shows a perspective view. Here, a first liquid 42 forms a doublet with a second liquid 44, with the curvature of interface surface 54, where both first and second liquids 42 and 44 are housed within a rectangular chamber 46 with windows 48. Windows 48 need not be planar, as shown in FIGS. 7A and 7B; a convex or concave curvature of one or both surfaces of window 48 could be advantageous for various applications. See FIG. 7C. Electrodes 50 act on one or both of the enclosed liquids 42 and 44 to shape interface surface 54, thereby forming a doublet that functions as a cylindrical lens, as is best pictured in the perspective view of FIG. 7B.

It is instructive to emphasize that the optical terminology "circular lens" and "cylindrical lens" as used herein describes the lens shape that is produced itself, rather than the shape of the vessel or chamber that holds the component first and second liquids 42 and 44 respectively. Right circular cylindrical chamber 36 in FIG. 6D is used to form the conventional circular lens shown as liquid lens 24 in FIGS. 6A-6C, circular about illumination axis I. In contrast, a rectangular chamber 46 as shown in FIG. 7B is used to form cylindrical liquid lens 40 of the present invention. In strict geometric terms, rectangular chamber 46 in FIG. 7B can be considered to be a type of cylindrical structure, but is not circularly cylindrical, as is cylindrical chamber 36 in FIG. 6D. Again, however, the emphasis is on the shape of the optical structure formed at liquid interface surface 54, rather than on the shape of the container holding the component liquids.

A number of different liquids could be used as first and second liquids 42 and 44 in cylindrical liquid lens 40 of the present invention. As was described above with reference to the graphs of FIGS. 4 and 5, the selection of suitable refractive indices is one factor in achieving the needed degree of angular divergence.

Flash Apparatus 20 Embodiments

Figure 8A:
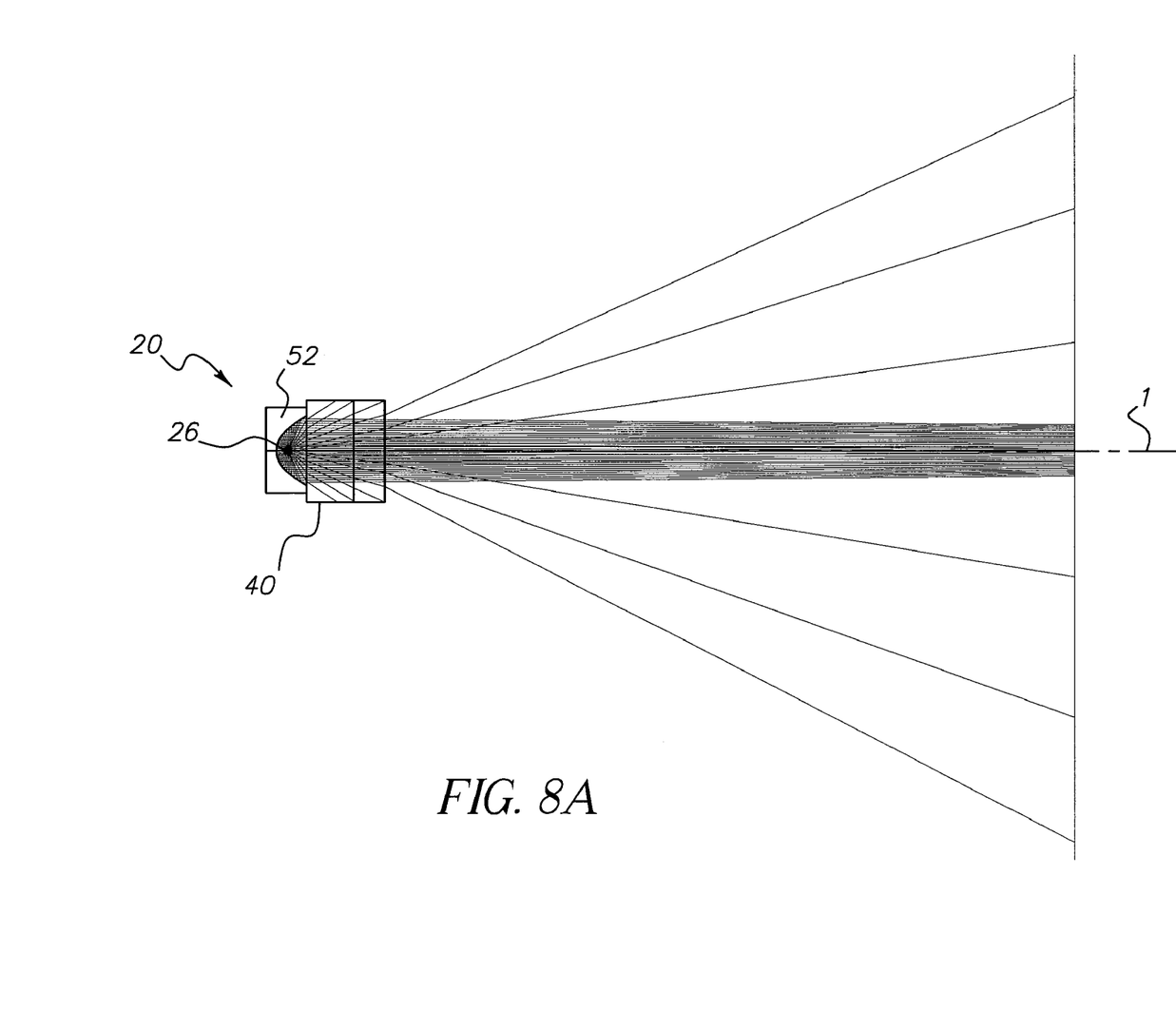
FIGS. 8A and 8B are cross-sectional diagrams showing refraction of collimated flash illumination for telephoto and wide angle zoom positions, respectively, for the liquid lens embodiment of FIGS. 7A and 7B.
Figure 8B:
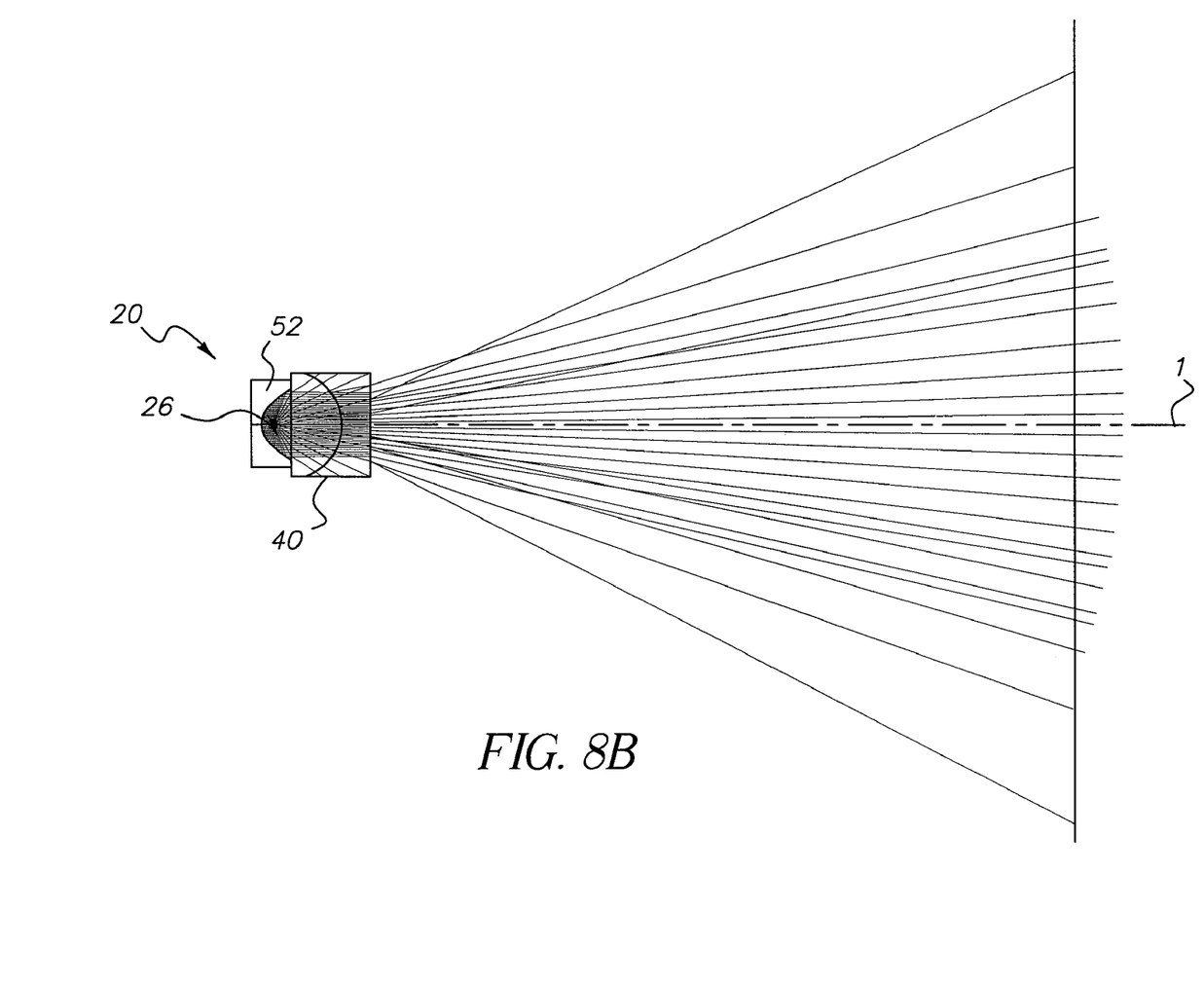

Referring to FIGS. 8A and 8B, there is shown, for no voltage and for applied voltage conditions, the refractive behavior of an embodiment of cylindrical liquid lens 40 having a tubular light source 26 with a parabolic reflector 52. FIG. 8A shows the no voltage condition best suited to telephoto zoom illumination. FIG. 8B shows the applied voltage condition for wide angle illumination.

As is true of cylindrical lenses in general, cylindrical liquid lens 40 primarily provides refraction relative to one axis, according to its orientation, with little or no refraction of light along the orthogonal axis. This is unlike the spherical lens behavior provided from circular liquid lens 24, which provides refraction for light across the full plane of incidence.

Figure 9A:
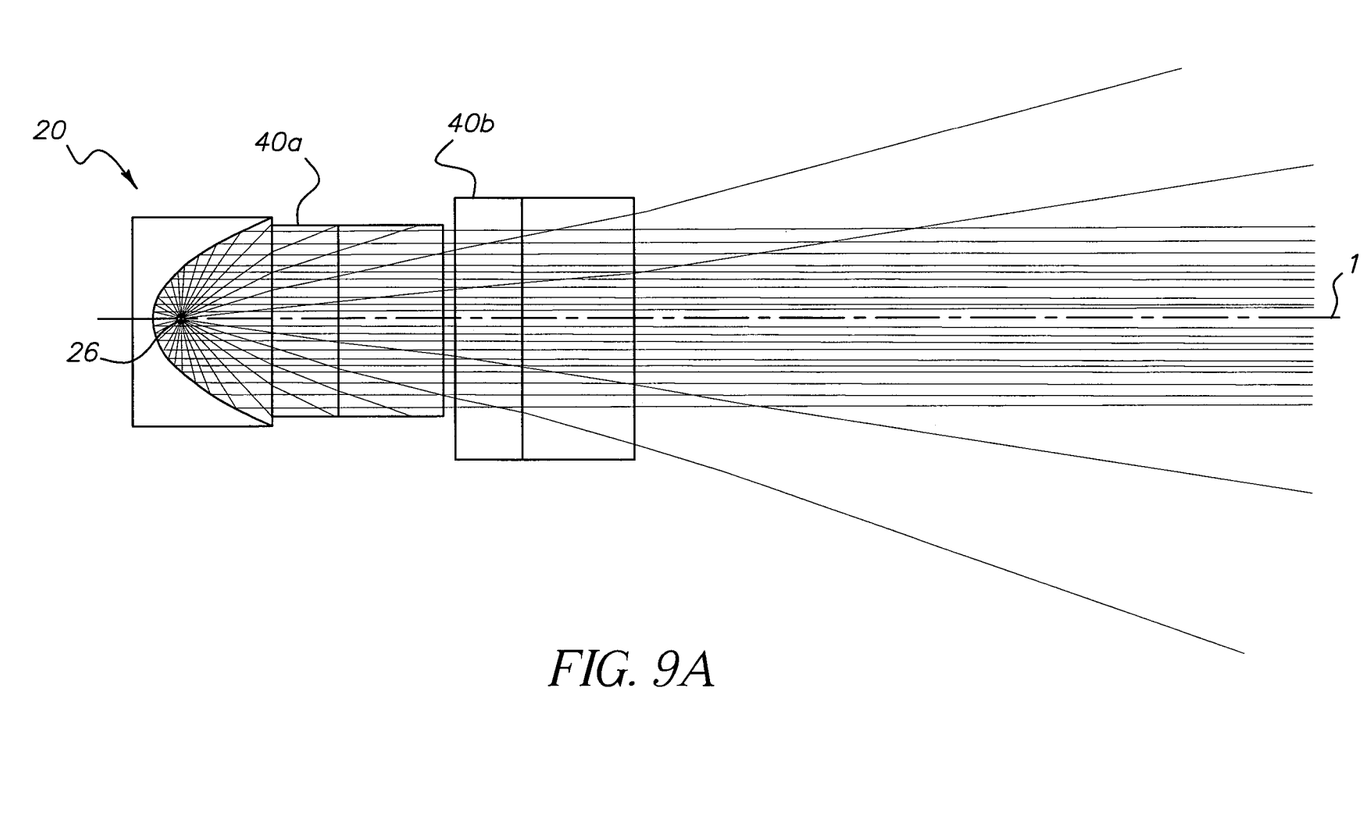
FIGS. 9A and 9B are cross-sectional diagrams showing refraction of collimated flash illumination for telephoto and wide angle zoom positions, respectively, using multiple liquid lenses in series in one embodiment.
Figure 9B:
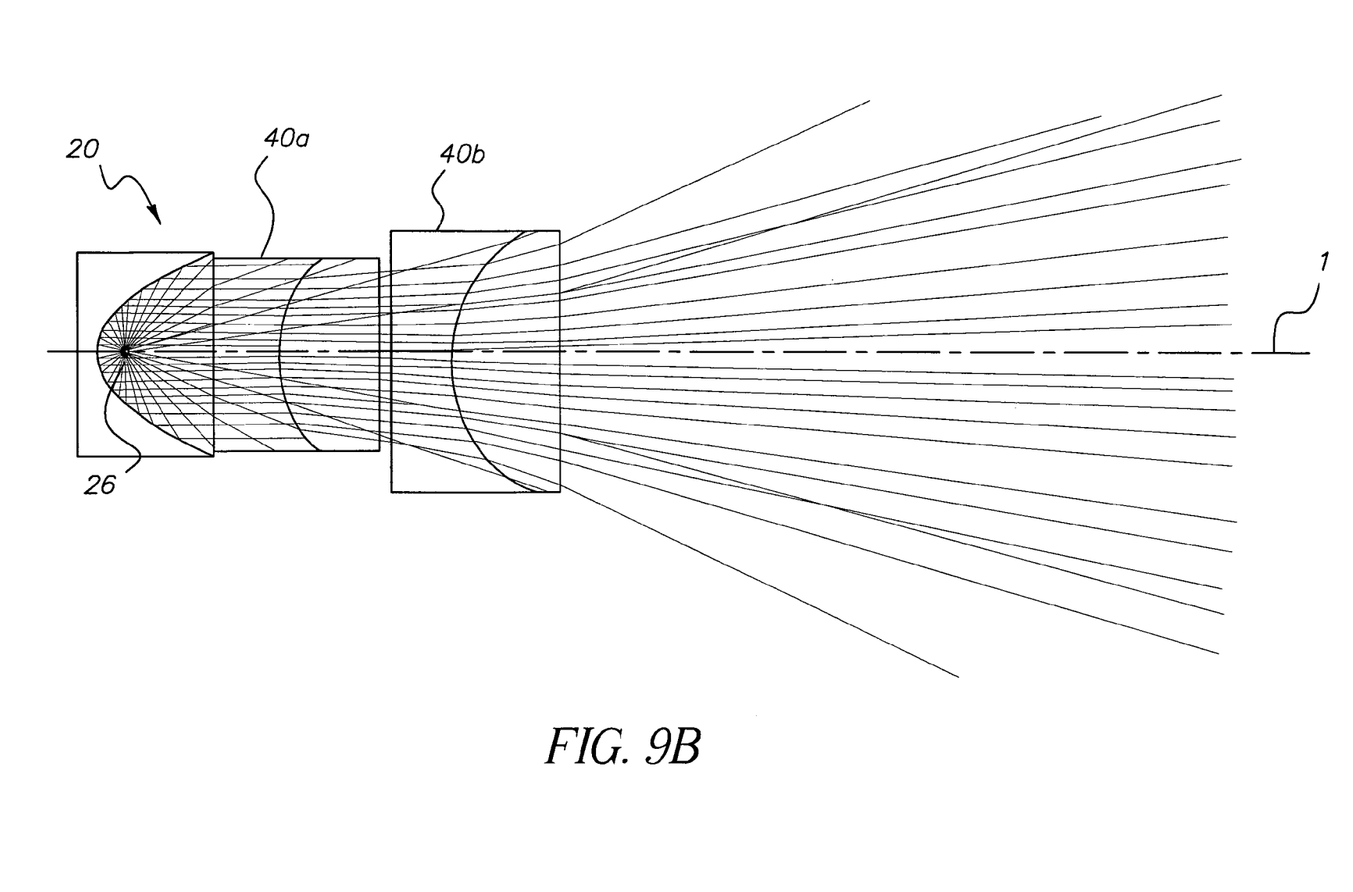

With this behavior in mind, combinations using more than a single cylindrical liquid lens 40 may also be advantageous in some applications. Referring to FIGS. 9A and 9B, there is shown an alternate embodiment of flash apparatus 20 in which a pair of cylindrical liquid lenses 40a and 40b are used, optically in series along illumination axis I. FIG. 9A shows the no voltage condition. FIG. 9B shows the applied voltage condition. This series arrangement, in which both cylindrical liquid lenses 40a and 40b have the same optical orientation, can be advantageous for increasing the divergence angle of illumination. Alternately, cylindrical liquid lenses 40a and 40b in series can be crossed at some other angle, such as orthogonally, to provide divergent light over different directions. Identical or different control voltage levels can be applied to each cylindrical liquid lens 40a and 40b.

Figure 10:
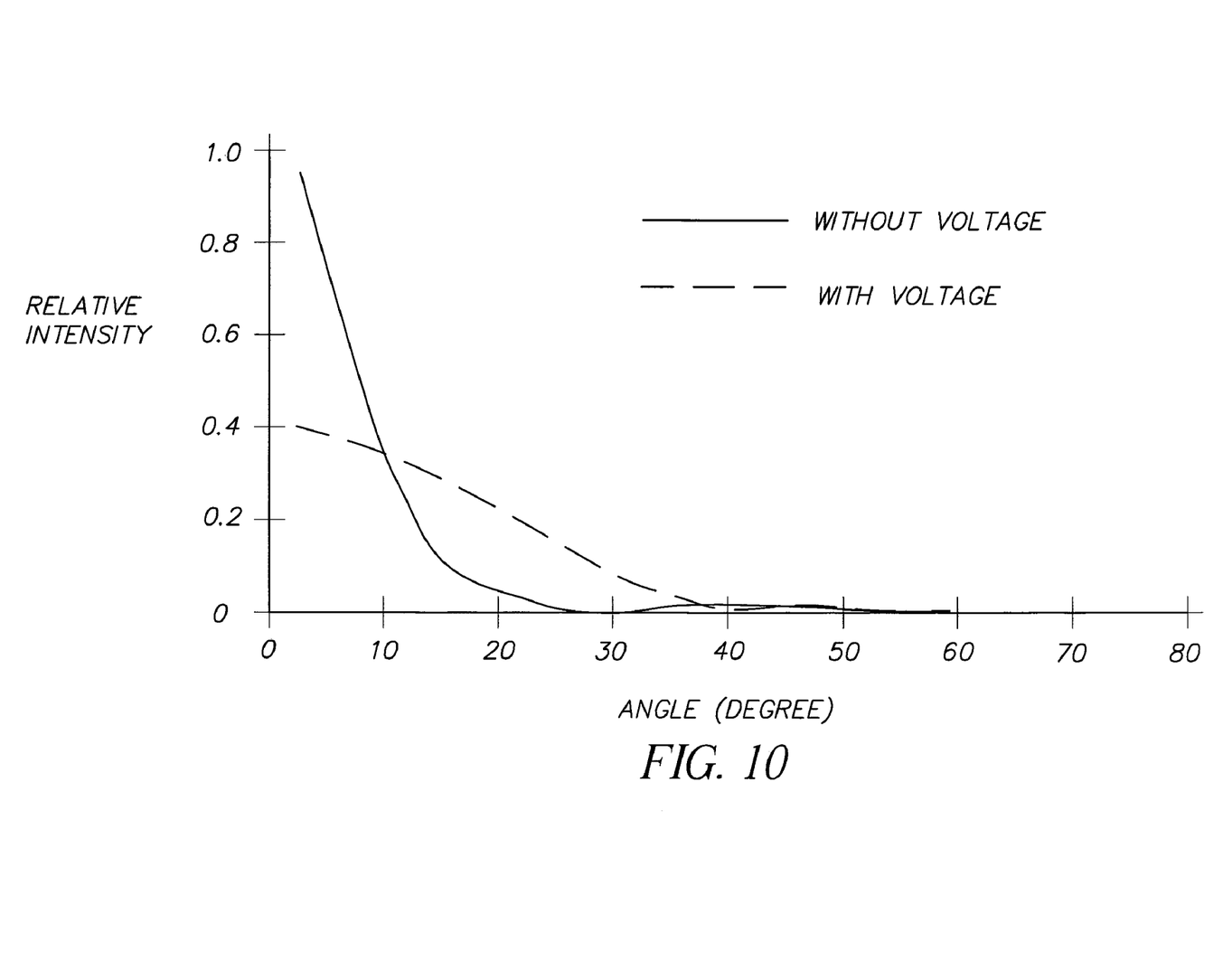
FIG. 10 is a graph showing zoom flash lens intensity with respect to angular spread, with and without applied voltage, when using multiple liquid lenses in series.

The graph of FIG. 10 shows the improved characteristic intensity versus angle for an embodiment using a pair of cylindrical liquid lenses 40a and 40b in series having the same orientation for refraction. It must be observed that two or more circular liquid lenses 24 could also be used in series. Still other arrangements could combine conventional circular liquid lenses 24 with cylindrical liquid lenses 40.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, an array of liquid lenses 24 or 40 arranged side-by-side could be used for improved light distribution in a zoom flash application. While the apparatus and methods described herein are well suited to use with zoom flash devices, this solution could also be used to serve other applications where variable angle illumination is required. A zoom flash apparatus utilizing liquid lens optics could be integral to the camera body itself, as is represented in FIG. 1, could protrude from the camera, could be separable from the camera as needed, or could be a separate unit altogether. Flash apparatus 20 of the present invention could be particularly well suited to an inexpensive camera, such as so-called "single-use" cameras. The range of available focus settings could be as few as two discrete, fixed settings or could be continuously adjustable over a range, set manually or using an automatic mechanism. The arrangement of electrodes for applying a control voltage signal allows a significant number of alternatives for shape and distribution, including the use of a single electrode and a grounded camera body, for example. Because the liquid lens is used for illumination rather than for high-resolution imaging, precision shaping of interface surface 54 is unnecessary, provided that light distribution is within needed levels and at suitable angles. Depending on the characteristics of the component fluids used, the application of voltage may be variable over a range from positive to negative values, yielding convex, flat, or concave liquid interface surfaces 54 in a variety of ways. The shape of the chamber containing the component fluids, considered in a plane orthogonal to the illumination axis, may be circular, polygonal, or employ some combination of arcuately or linearly shaped walls.

Thus, what is provided is an apparatus and method for a flash illumination apparatus capable of operation at variable scene coverage angles.

Parts List 10 camera apparatus
12 zoom lens
14 control logic processor
16 shutter control
18 actuator
20 flash apparatus
22 recording medium
24 liquid lens
26 light source
26a light source
26b light source, well collimated
28 no-voltage curve
30 LED
32 voltage applied curve
34 collimator structure
36 cylindrical chamber
38 sensor
40 cylindrical liquid lens
40a cylindrical liquid lens
40b cylindrical liquid lens
42 first liquid
44 second liquid
46 rectangular chamber
48 window
50 electrode
52 parabolic reflector
54 liquid interface surface

The invention claimed is:

1. A camera apparatus comprising:
   a) a zoom lens having a zoom focus setting that is adjustable over a range of focus values;
   b) control circuitry for generating at least one variable voltage potential according to the zoom focus setting;
   c) a flash illumination apparatus comprising a light source and a plurality of variable focus lenses, each variable focus lens comprising:
      i) a first and a second fluid in a chamber, the fluids having different indices of refraction, the fluids being non-miscible and being in contact over an interface surface with variable shape;
      ii) an electrode for applying the variable voltage potential within the chamber for shaping the interface surface according to the zoom focus setting; and
   wherein at least two of the variable focus lenses are disposed side by side.

2. A camera according to claim 1 wherein at least two of the variable focus lenses are disposed optically in series along a common illumination axis.

3. The camera apparatus of claim 1 wherein the chamber for at least one variable focus lens is substantially circularly cylindrical.

4. The camera apparatus of claim 1 wherein the chamber for at least one variable focus lens is substantially rectangular.

5. The camera apparatus of claim 1 wherein the interface surface for at least one variable focus lens defines a substantially spherical lens.

6. The camera apparatus of claim 1 wherein the interface surface for at least one variable focus lens defines a substantially cylindrical lens.

7. The flash illumination apparatus of claim 1 wherein the chamber comprises at least one window, the window having a convex surface orthogonal to the illumination axis.

8. The flash illumination apparatus of claim 1 wherein the chamber comprises at least one window, the window having a concave surface orthogonal to the illumination axis.

* * * * *